US011242691B2

(12) United States Patent
Williams

(10) Patent No.: US 11,242,691 B2
(45) Date of Patent: Feb. 8, 2022

(54) COLLAPSIBLE MOBILE STAGE SYSTEM

(71) Applicant: Steven Williams, Boca Raton, FL (US)

(72) Inventor: Steven Williams, Boca Raton, FL (US)

(*) Notice: Subject to any disclaimer, the term of this patent is extended or adjusted under 35 U.S.C. 154(b) by 0 days.

(21) Appl. No.: 16/884,895

(22) Filed: May 27, 2020

(65) Prior Publication Data

US 2020/0378142 A1 Dec. 3, 2020

Related U.S. Application Data

(60) Provisional application No. 62/853,056, filed on May 27, 2019.

(51) Int. Cl.
| | |
|---|---|
| *E04H 3/28* | (2006.01) |
| *E04H 3/12* | (2006.01) |
| *E04H 3/30* | (2006.01) |
| *B60P 3/025* | (2006.01) |

(52) U.S. Cl.
CPC .............. *E04H 3/28* (2013.01); *E04H 3/126* (2013.01); *E04H 3/30* (2013.01); *B60P 3/0252* (2013.01)

(58) Field of Classification Search
CPC . A63B 71/1225; A63C 19/005; B60P 3/0252; E04H 3/123; E04H 3/126; E04H 3/28; E04H 3/30
See application file for complete search history.

(56) References Cited

U.S. PATENT DOCUMENTS

| | | | | |
|---|---|---|---|---|
| 2,635,889 A | * | 4/1953 | Concello | B60P 3/0252 280/30 |
| 2,817,121 A | * | 12/1957 | Mackintosh | E04H 3/126 52/9 |
| 2,846,221 A | * | 8/1958 | Skinner | A63J 1/00 472/75 |
| 2,859,488 A | * | 11/1958 | Mackintosh | E04H 3/126 52/9 |
| 3,070,849 A | * | 1/1963 | Irwin | E04H 3/12 52/8 |
| 3,103,707 A | * | 9/1963 | Lappin | E04H 3/126 52/9 |
| 3,181,203 A | * | 5/1965 | Wenger | E04H 3/12 52/6 |

(Continued)

FOREIGN PATENT DOCUMENTS

WO 2014131135 A1 9/2014

*Primary Examiner* — James M Ference
(74) *Attorney, Agent, or Firm* — Allen F. Bennett; Bennett Intellectual Property

(57) ABSTRACT

A collapsible mobile stage may be folded into a configuration and the shape of a trailer that may be hauled by a truck. The collapsible mobile stage includes an elevated framework supported by telescoping columns. The elevated framework may be used to support lighting, audio and visual systems. The mobile stage also provides seating for an audience on either side of a central stage supported by a platform. The platform includes a central segment between two opposing lateral segments. The lateral segments may be folded up to form the sides of a trailer while the central segment forms the bottom of the trailer. Audience seating sections may be folded over the platform segments to create the roof of the trailer. Audience seating as well as the elevated framework may be stored within the trailer or within a secondary trailer.

1 Claim, 10 Drawing Sheets

(56) References Cited

U.S. PATENT DOCUMENTS

| | | | | |
|---|---|---|---|---|
| 3,258,884 A * | 7/1966 | Wenger | E04H 3/22 | 52/6 |
| 3,417,518 A * | 12/1968 | Jaffe | E04B 1/3444 | 52/7 |
| 3,564,790 A * | 2/1971 | Rehfeld | E04F 11/18 | 52/183 |
| 3,620,564 A * | 11/1971 | Wenger | B60P 3/0252 | 296/83 |
| 3,752,531 A * | 8/1973 | Jones | E04H 3/126 | 296/64 |
| 3,885,827 A * | 5/1975 | Sanders | B60P 3/0252 | 296/64 |
| 3,914,909 A * | 10/1975 | McNeal | B60P 3/0252 | 52/9 |
| 3,924,366 A * | 12/1975 | Gibbs | E04B 1/3444 | 52/69 |
| 4,026,076 A * | 5/1977 | Analetto | E04H 3/28 | 52/6 |
| 4,102,086 A * | 7/1978 | Korman | E04H 3/126 | 52/183 |
| 4,232,488 A * | 11/1980 | Hanley | B60P 3/0252 | 108/166 |
| 4,412,403 A * | 11/1983 | LeFranc | E04H 3/126 | 296/64 |
| 4,512,117 A * | 4/1985 | Lange | E04H 3/10 | 403/331 |
| 4,571,895 A * | 2/1986 | Lyman, Jr. | E04H 3/123 | 108/93 |
| 4,611,439 A * | 9/1986 | Graham, Jr. | E04H 3/126 | 52/143 |
| 4,720,945 A * | 1/1988 | Berranger | B60P 3/0252 | 52/7 |
| 4,783,934 A * | 11/1988 | Langhart | E04C 3/005 | 187/214 |
| 4,934,113 A * | 6/1990 | Hall | E04H 3/123 | 182/223 |
| 5,031,727 A * | 7/1991 | Clare | B66F 7/04 | 187/213 |
| 5,050,353 A * | 9/1991 | Rogers | E04H 3/28 | 52/8 |
| 5,078,442 A * | 1/1992 | Rau | E04H 3/24 | 296/26.02 |
| 5,152,109 A * | 10/1992 | Boers | B60P 3/0252 | 296/26.02 |
| 5,205,101 A * | 4/1993 | Swan | E04B 1/34331 | 411/344 |
| RE34,468 E * | 12/1993 | Rau | E04H 3/24 | 296/26.02 |
| 5,325,640 A * | 7/1994 | Luedke | E04H 3/126 | 52/9 |
| 5,327,698 A * | 7/1994 | Uhl | B60P 3/025 | 52/144 |
| 5,343,817 A * | 9/1994 | Abraham | A47C 12/02 | 108/97 |
| 5,365,704 A * | 11/1994 | Ray | E04H 3/26 | 472/92 |
| 5,375,899 A * | 12/1994 | Wright | B60P 3/025 | 296/21 |
| 5,381,873 A * | 1/1995 | Kniefel | E04H 3/126 | 182/152 |
| 5,461,832 A * | 10/1995 | Smith | E04B 1/344 | 52/143 |
| D371,330 S * | 7/1996 | Wright | D12/97 | |
| 5,546,709 A * | 8/1996 | Decker | E04H 3/28 | 296/26.07 |
| 5,613,450 A * | 3/1997 | Wagner | E04H 3/28 | 108/170 |
| 5,615,451 A * | 4/1997 | Peterson | B60B 33/06 | 16/34 |
| 5,653,502 A * | 8/1997 | Kimura | A47C 1/126 | 297/217.7 |
| 5,660,000 A * | 8/1997 | MacIntyre | E04H 3/126 | 108/115 |
| 5,661,928 A * | 9/1997 | Beu | E04H 3/123 | 160/202 |
| 5,706,616 A * | 1/1998 | Fernandez | B60P 3/0252 | 296/24.3 |
| 5,716,090 A * | 2/1998 | Chang | B60P 3/0252 | 296/26.01 |
| 5,848,501 A * | 12/1998 | Taipale | E04F 11/002 | 52/126.4 |
| 5,908,360 A * | 6/1999 | Guillont | A63B 67/002 | 473/416 |
| 5,915,132 A * | 6/1999 | Counts, Jr. | G03B 15/10 | 396/1 |
| 5,916,091 A * | 6/1999 | Schultz | E04H 3/123 | 52/8 |
| 5,921,031 A * | 7/1999 | Williams | E04H 3/123 | 52/8 |
| 5,947,502 A * | 9/1999 | Kammerzell | E04H 3/28 | 280/442 |
| 5,979,125 A * | 11/1999 | Guillet | E04H 3/126 | 296/26.02 |
| 6,024,026 A * | 2/2000 | Botts | E04H 3/28 | 108/170 |
| 6,070,367 A * | 6/2000 | Wagner | E04H 3/28 | 52/7 |
| 6,176,495 B1 * | 1/2001 | Decker | B60S 9/12 | 280/6.153 |
| 6,393,769 B1 * | 5/2002 | Mertik | B60P 3/0252 | 296/162 |
| 6,625,932 B1 * | 9/2003 | Littlefield | E04H 3/126 | 52/10 |
| 6,694,677 B2 * | 2/2004 | Ortner | E04H 3/123 | 182/106 |
| 7,546,705 B1 * | 6/2009 | Rivera, Jr. | E04H 3/126 | 182/132 |
| 8,029,368 B2 * | 10/2011 | Novis | A63F 13/27 | 463/42 |
| D672,054 S * | 12/2012 | Mertik | D25/18 | |
| 8,336,236 B2 * | 12/2012 | Boltz | G09F 15/0025 | 40/604 |
| 8,544,213 B2 | 10/2013 | Allison | | |
| 8,567,811 B1 * | 10/2013 | Jones | B60P 3/0252 | 280/656 |
| 8,844,206 B2 * | 9/2014 | Johnstone | B60P 3/0252 | 52/7 |
| 8,978,311 B1 * | 3/2015 | Uhl | B60P 3/0252 | 52/7 |
| 9,021,746 B1 * | 5/2015 | Uhl | E04B 1/34357 | 52/8 |
| 9,103,111 B2 * | 8/2015 | Nakajima | B60P 3/34 | |
| 9,326,611 B1 * | 5/2016 | Briggs | A47C 1/12 | |
| 9,394,708 B2 * | 7/2016 | Doucet | E04H 3/28 | |
| 2002/0056239 A1 * | 5/2002 | Paddock | E04H 3/12 | 52/183 |
| 2002/0078633 A1 * | 6/2002 | Jines | E04H 3/126 | 52/8 |
| 2002/0092244 A1 * | 7/2002 | Santa Cruz | A63J 1/028 | 52/7 |
| 2004/0123529 A1 * | 7/2004 | Wiese | E04H 3/28 | 52/6 |
| 2005/0083690 A1 * | 4/2005 | Griffin | F21S 2/00 | 362/249.08 |
| 2008/0030853 A1 * | 2/2008 | Creel | G03B 21/58 | 359/461 |
| 2009/0193722 A1 * | 8/2009 | Carlson | E04H 3/126 | 52/6 |
| 2009/0195008 A1 * | 8/2009 | Braswell | B60P 3/0252 | 296/26.15 |
| 2011/0099915 A1 * | 5/2011 | Sudkamp | E04H 3/123 | 52/9 |
| 2011/0203204 A1 * | 8/2011 | Messier | E04H 3/24 | 52/272 |
| 2011/0219705 A1 * | 9/2011 | Uhl | E04H 3/126 | 52/9 |

(56) References Cited

U.S. PATENT DOCUMENTS

| | | | | |
|---|---|---|---|---|
| 2012/0096775 A1* | 4/2012 | Allison | .................. | E04B 1/3442 |
| | | | | 52/7 |
| 2012/0272584 A1* | 11/2012 | Bilsen | ....................... | E04H 3/28 |
| | | | | 52/7 |
| 2012/0272585 A1* | 11/2012 | Bilsen | ....................... | E04H 3/28 |
| | | | | 52/7 |
| 2012/0277010 A1* | 11/2012 | Bilsen | .................. | B60P 3/0252 |
| | | | | 472/75 |
| 2013/0019539 A1* | 1/2013 | Gardner | .................... | E04H 3/14 |
| | | | | 52/8 |
| 2013/0333302 A1* | 12/2013 | Valente | .................... | E04H 3/126 |
| | | | | 52/7 |
| 2014/0230340 A1* | 8/2014 | Fox | ........................... | E04H 3/26 |
| | | | | 52/1 |
| 2014/0235362 A1* | 8/2014 | Fox | ....................... | H04N 13/363 |
| | | | | 472/75 |
| 2014/0360104 A1* | 12/2014 | Jannotti Newlands | ....................... | |
| | | | | G09F 17/00 |
| | | | | 52/7 |
| 2015/0107164 A1* | 4/2015 | Jung | ......................... | E04H 3/28 |
| | | | | 52/7 |
| 2015/0231485 A1* | 8/2015 | Ton | ....................... | A63C 19/005 |
| | | | | 472/93 |
| 2016/0289985 A1* | 10/2016 | Stroud | .................... | B60P 3/0252 |
| 2017/0134712 A1* | 5/2017 | Remer | ................. | H04N 13/156 |
| 2018/0126251 A1* | 5/2018 | Gurgel | .................... | A63B 71/02 |
| 2020/0378142 A1* | 12/2020 | Williams | ................. | E04H 3/123 |

* cited by examiner

COLLAPSIBLE MOBILE STAGE SYSTEM

CROSS-REFERENCE TO RELATED APPLICATIONS

This application claims priority to U.S. Provisional Application Ser. No. 62/853,056 filed on May 27, 2019.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a mobile stage. More particularly, the invention relates to a mobile stage that collapses into a trailer and provides seating for an audience.

Description of the Related Art

Mobile performance stages are commonly used for temporary venues, performances, or rallies. Typical mobile performance stages must be assembled on site. A mobile stage can be generally defined as a transportable construction to be assembled and disassembled at designated locations, generally outdoors, so as to provide a place where people such as musicians, actors, entertainers, politicians and spokespersons, to name just a few, can appear in front of a live audience. A mobile stage has a framework that generally includes an overhead roof structure supported by column structures and an elevated floor structure. The roof structure can provide a support for scenic equipment such as lights, wide screens, speakers and others, depending on the nature of the event and the venue.

Mobile stages are often an economical alternative to erecting a permanent stage at a site. The typical reasons for electing to use a mobile stage include temporary use, cost, and reliability. Cutting the costs of using a mobile stage provides additional incentive for using a mobile stage. The simplest way to cut costs would be to reduce the number of persons required to setup and operate the stage. Costs are also saved when a mobile stage is durable and has a long effective lifespan. These cost savings can be passed on to customers, increasing the incentive to use one mobile stage over another.

Typical mobile stages generally provide a platform to serve as the stage itself as well as an overhead framework that supports a roof, lighting systems, audio systems, visual systems and/or other components commonly used during various performances. They do not typically provide bleachers or other components that provide seating or other amenities to an audience.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description. In view of the foregoing, it is desirable to provide a collapsible mobile stage that includes seating for an audience.

BRIEF SUMMARY OF THE INVENTION

Disclosed is a collapsible mobile stage which may be folded into a configuration and the shape of a trailer that may be hauled by a truck. The collapsible mobile stage includes an elevated framework supported by telescoping columns. The elevated framework may be used to support lighting, audio and visual systems. The mobile stage also provides seating for an audience on either side of a central stage supported by a platform. The platform includes a central segment between two opposing lateral segments. The lateral segments may be folded up to form the sides of a trailer while the central segment forms the bottom of the trailer. Audience seating sections may be folded over the platform segments to create the roof of the trailer. Audience seating as well as the elevated framework may be stored within the trailer or within a secondary trailer.

In one embodiment, a mobile stage comprises an overhead framework formed from four main trusses, four secondary trusses and a diamond shaped central structure which support a lighting system, audio system and/or video systems. Four collapsible telescoping columns support the framework at each of four corners. Two opposing lateral bleacher sections face a central stage and have support structures hidden by skirts. A platform supports the central stage and extends between the opposing lateral bleacher sections. The platform includes a central platform segment and two lateral platform segments. Railing extends along the front and rear of the lateral platforms. A folding staircase is positioned at the rear end of the central platform.

In another embodiment, the mobile stage is collapsed by disassembling and removing the framework and supporting columns, disassembling and removing the lateral bleachers, folding the two lateral platform segments such that they are perpendicular to the central platform segment to form the sides of a trailer. The bleacher sections are folded over each other about the lateral and central platforms to form the roof of the trailer. The framework and/or the bleachers are stored within the trailer.

It is therefore an object of the present invention to provide a collapsible mobile stage.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
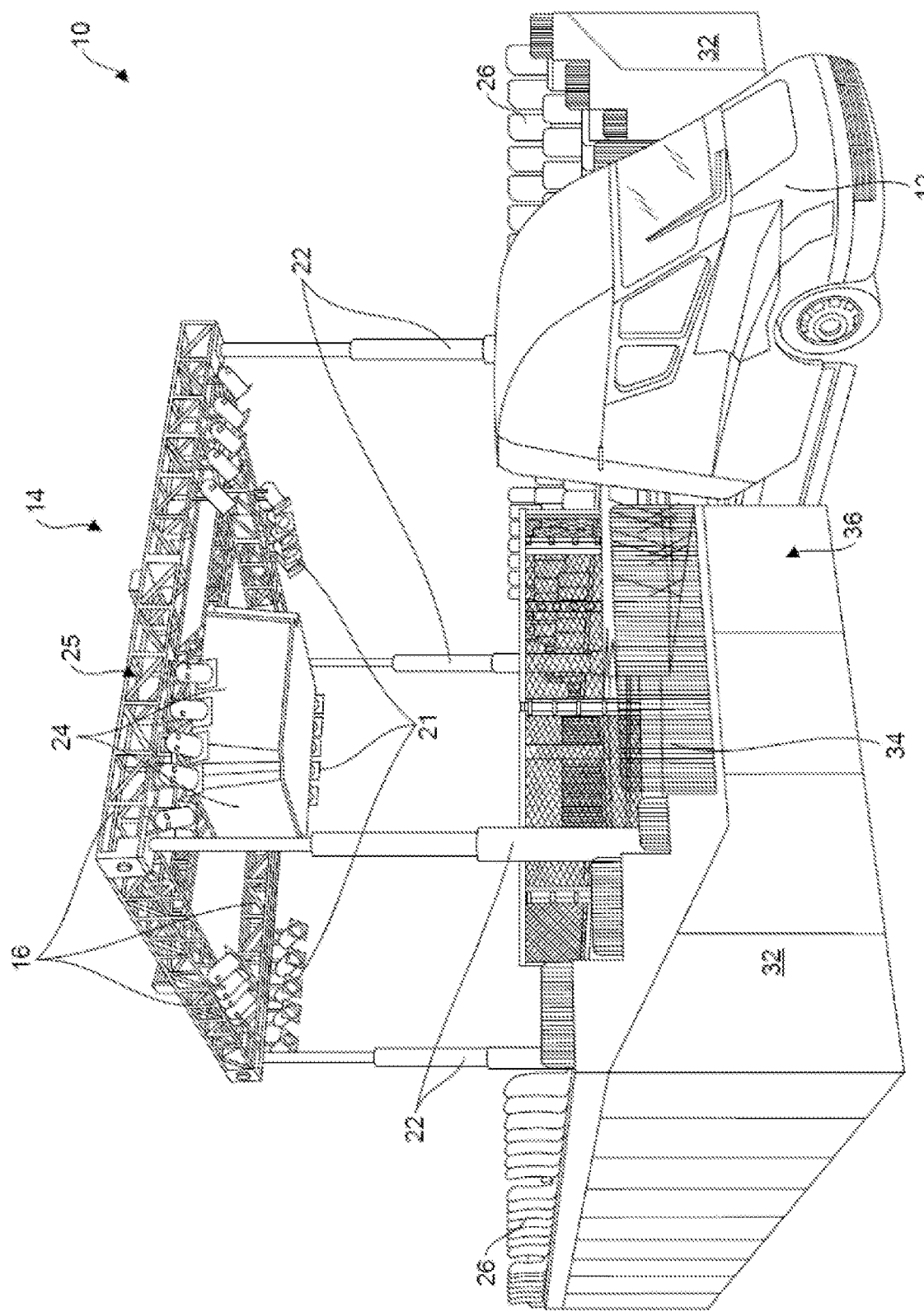
FIG. 1 is an environmental view of a collapsible mobile stage in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Disclosed is a mobile stage including a stage, an overhead framework and bleachers for an audience. The mobile stage may be collapsed into a configuration having the same shape as a typical trailer. The mobile stage may optionally include components which collapse into a second separate trailer. The mobile stage also includes a ring for athletic activities, such as wrestling or boxing, positioned between opposing sets of bleachers.

Figure 2:
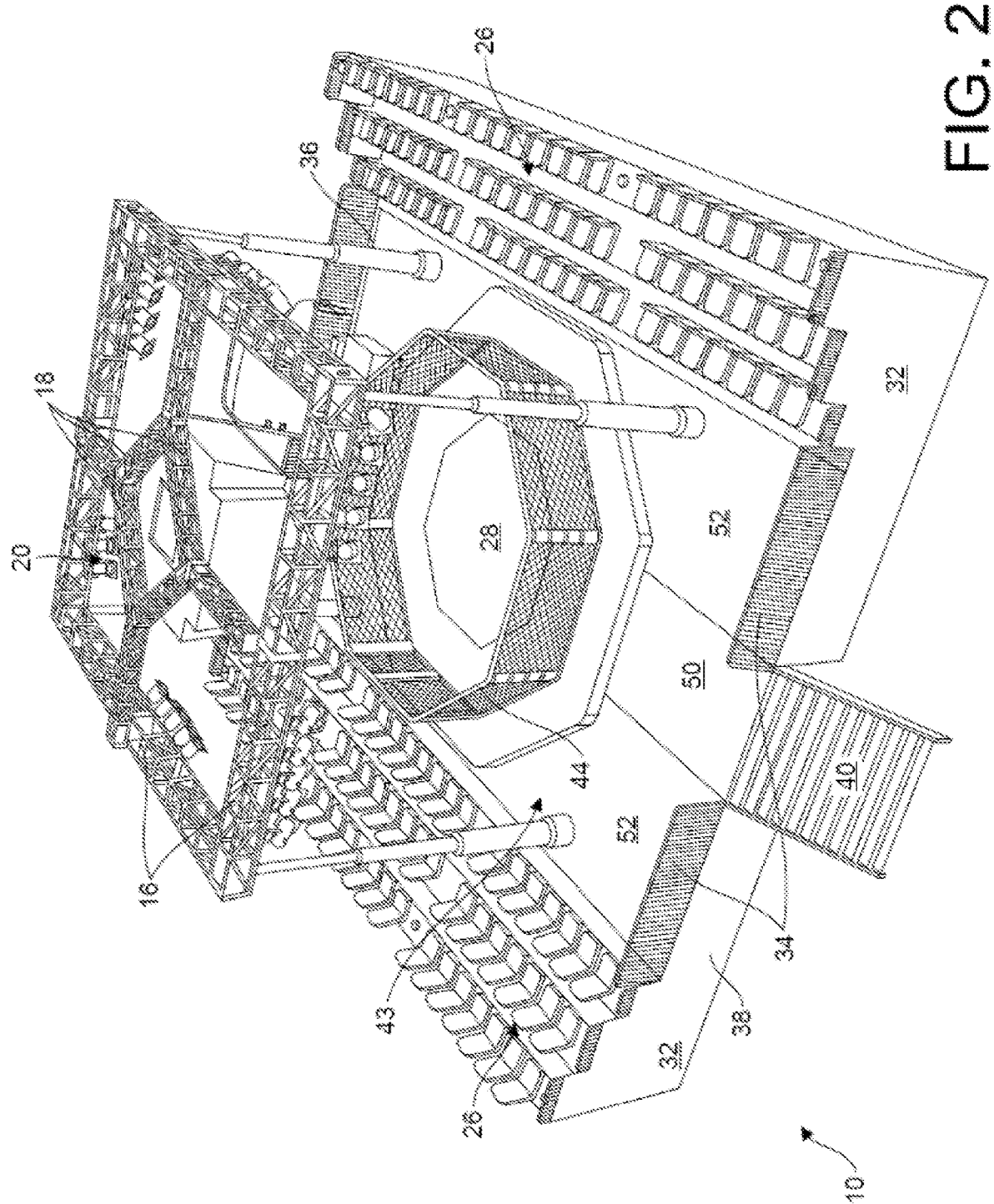
FIG. 2 is another environmental view of a collapsible mobile stage in accordance with the principles of the invention.
Figure 3:
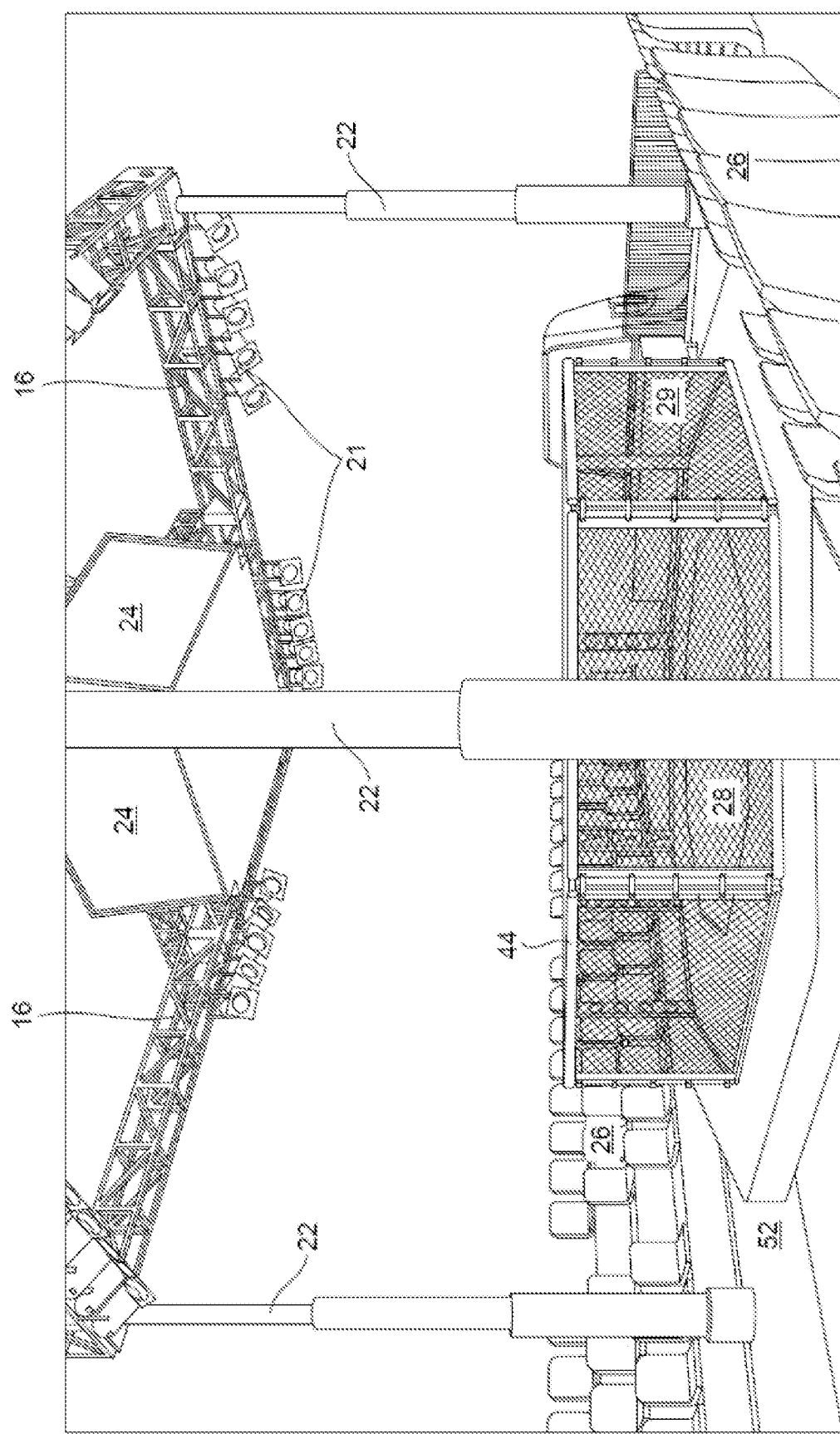
FIG. 3 is another environmental view of a collapsible mobile stage in accordance with the principles of the invention.

FIGS. 1-3 show a mobile stage 10 in accordance with the principles of the invention. In this embodiment, the mobile stage 10 is collapsible into the shape of a trailer and is attached to a truck 12. A square overhead framework 14 is formed from four peripheral trusses 16, four radial trusses 18 and a central structure 20. The framework 14 supports lights 22 removably attached to the peripheral trusses 16. An overhead display system 25 includes video screens 24 and optionally additional speakers, microphones and/or cameras. The framework 14 is supported by four collapsible, telescoping columns 18, located at each of the four corners. The telescoping columns 18 may be actuated by hydraulics or raised and lowered by other means.

Two lateral opposing bleacher sections 26 face a central stage 28. A dias 29 is positioned between the central stage 28 and the front 36 of the platform 43. The bleacher sections 26 may include seats 30 as shown in this embodiment. Optionally, the bleacher sections 26 may include benches or provide only standing room to maximize capacity. The bleacher sections 26 are supported by their own support structures underneath, which are hidden in this embodiment by skirts 32. Railing 34 is located at the front 36 and rear 38 of the mobile stage 10. The rear end 38 also includes a folding extendable staircase 40. In this embodiment, the central stage 28 has an octagon shape and is surrounded by a rail 44. The central stage 42 is slightly elevated relative to a central platform segment 43 and also includes ornamentation which may comprise advertising by sponsors. Additional seating may optionally be provided at the front 36 and rear 38 of the mobile stage 10 between the central stage 42 and the railing 34.

In one embodiment, the framework 14 and telescoping columns 18 may be disassembled and removed from the platform 43. The lateral opposing bleacher sections 26 may also similarly be removed. The platform 43 may be divided into a central platform segment 50 and two lateral platform segments 52. To collapse the mobile stage 10, the two lateral platform segments 52 are folded upward to form the sides of a trailer and the bleacher 26 are folded perpendicular to the lateral platforms 52 and overlap to form the top of the trailer. The trailer may be used to store some or all of the framework 14 and bleacher sections 26 which were removed. Optionally, one or more additional trailers may be used to store components removed during the collapsing process.

The lateral opposing bleacher sections 26 of this embodiment include individual seats. These bleacher sections may optionally be replaced with different bleacher sections having different configurations. This allows the same mobile stage 10 system to be utilized for different overall configurations. Similarly, different central stages may be used to replace the octagonal central stage of this embodiment. Audio systems may also optionally be affixed to the framework 14. The railing 34 may be utilized to limit and control access to the mobile stage 10.

Figure 4:
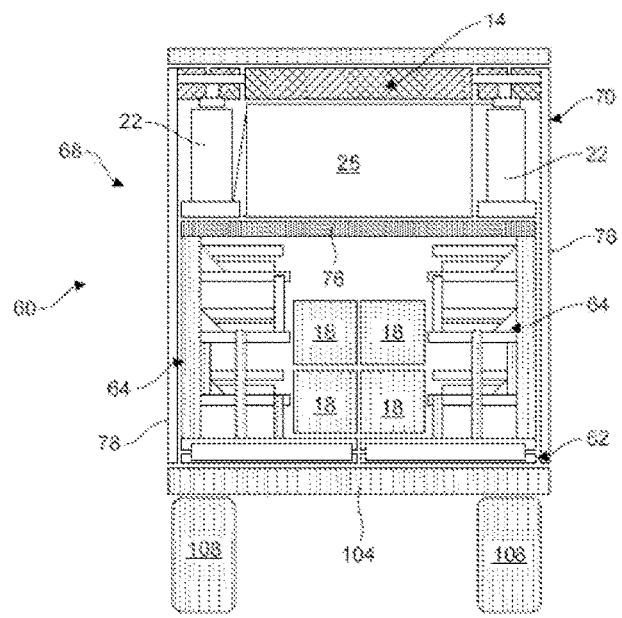
FIG. 4 is a rear view of a mobile stage system in a collapsed configuration in accordance with principles of the invention.
Figure 5:
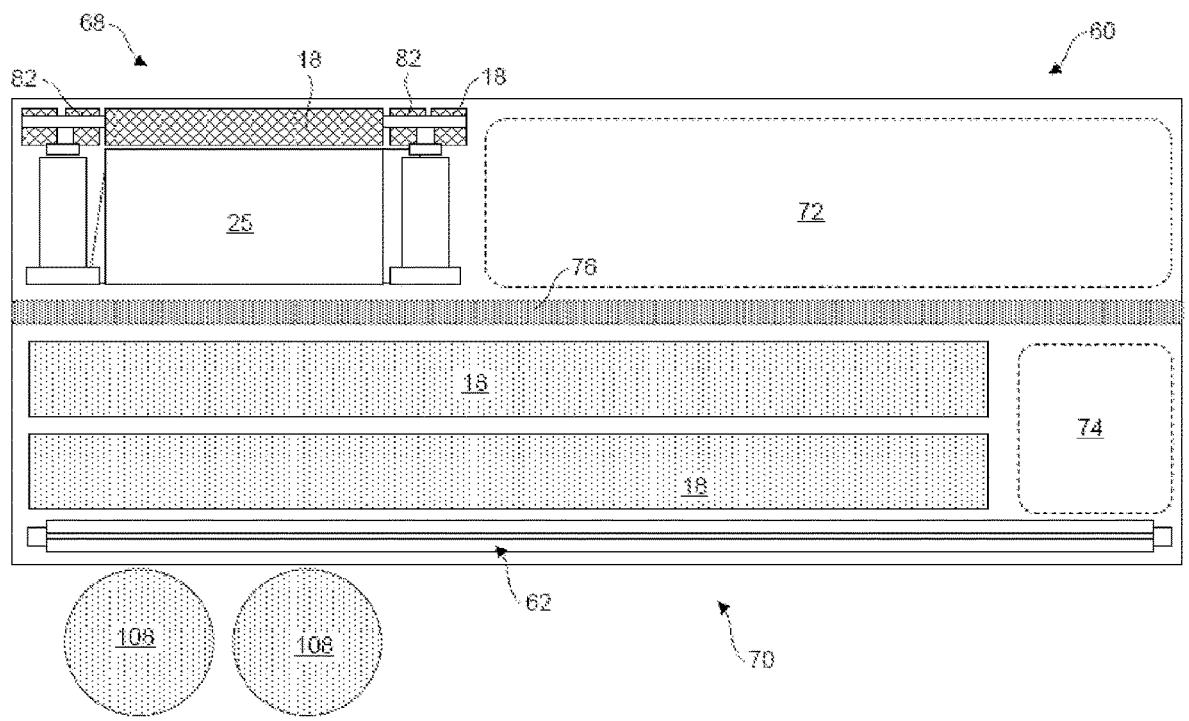
FIG. 5 is a side cross-sectional view of a mobile stage system in a collapsed configuration in accordance with the principles of the invention.

FIGS. 4-17 show an alternative embodiment of a mobile stage system 60 in accordance with principles of the invention. The mobile stage system 60 utilizes the same overhead framework 14 supported by telescoping columns 22 removably mounted on a collapsible platform 62 which supports lateral retracting bleachers 64. The mobile stage system 60 is transported in a collapsed configuration 68 shown in FIGS. 4 and 5, which takes the form of a trailer 70 attachable to a rig such as truck 12 shown in FIG. 1. The trailer 70 contains the retracted bleachers 64, the telescoping columns 22, the overhead framework 14, the display system 25 and also provides sufficient room for additional material such as a central stage and other equipment in storage compartments 72 and 74. The four peripheral trusses 16 are positioned between the retracted bleachers 64 within the trailer 70. A central platform 76 extends over the retracted bleachers 64 and supports the display system 25, the telescoping columns 22 and the other components of the overhead framework 14 above the retracted bleachers 64 and in between the two sidewalls 78.

Figure 6:
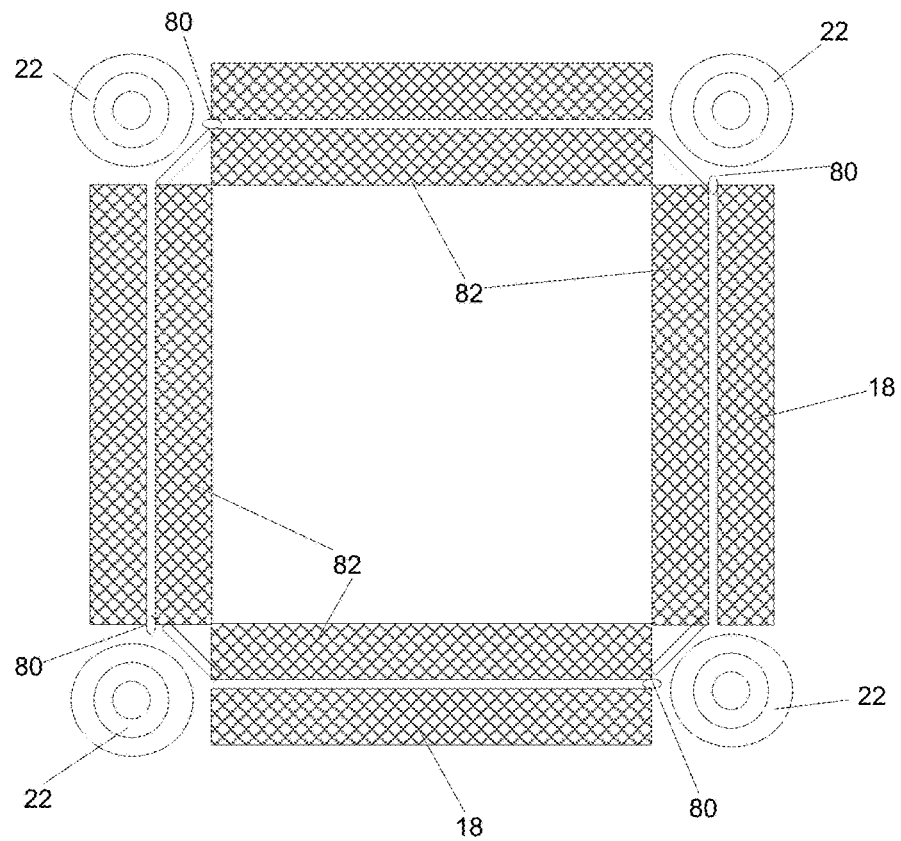
FIG. 6 is a top plan view of a collapsed overhead frame, display system and telescoping columns of a mobile stage system in a collapsed configuration in accordance with principles of the invention.
Figure 7:
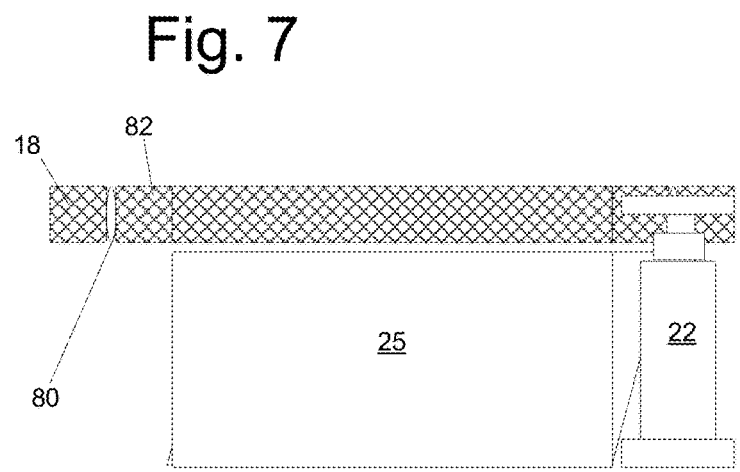
FIG. 7 is a side elevation view of a collapsed overhead framework, display system and telescoping column of a mobile stage system in a collapsed configuration in accordance with principles of the invention.
Figure 8:
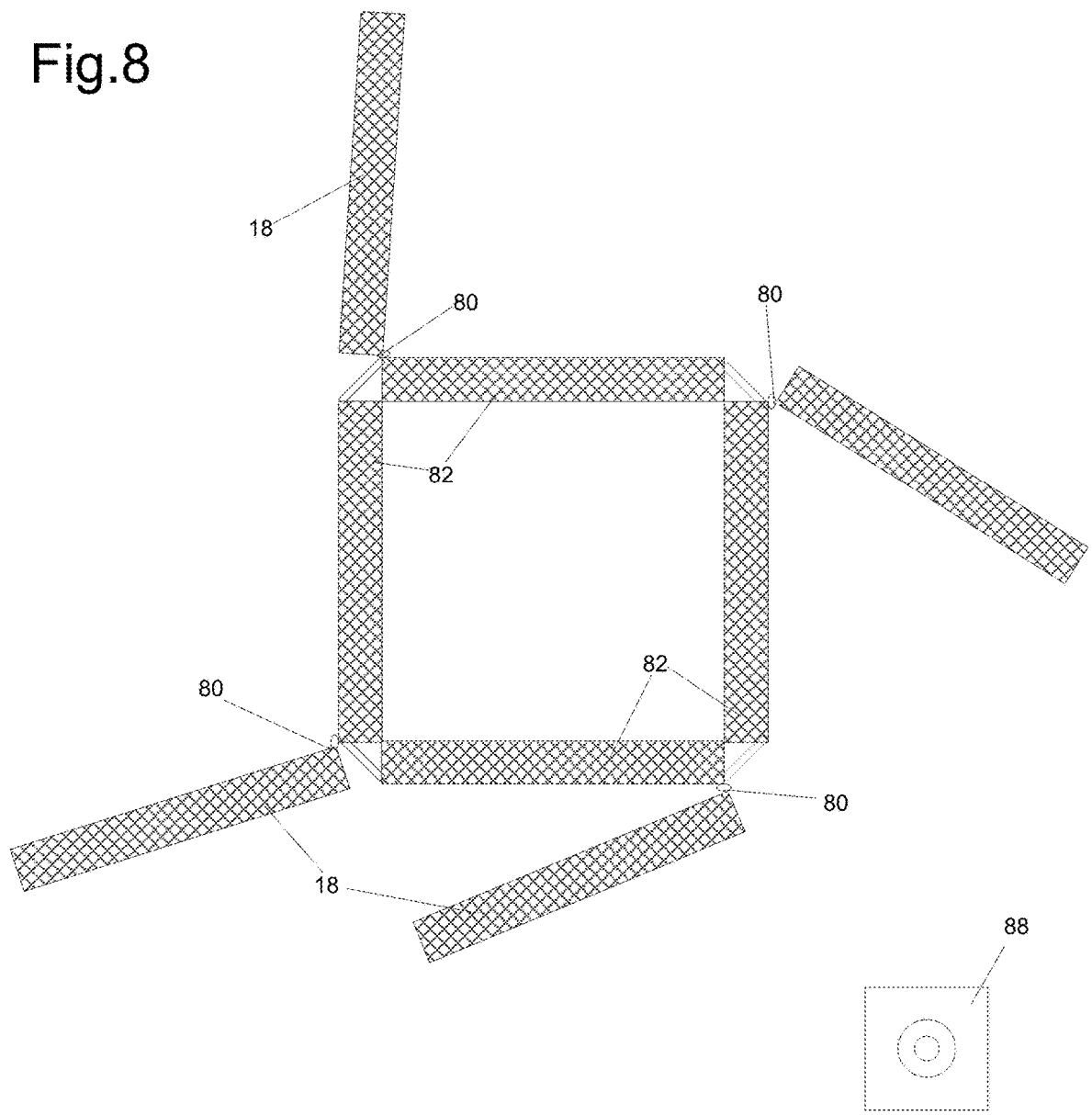
FIG. 8 is a top plan view of a partially expanded overhead framework of a mobile stage system in accordance with the principles of the invention.
Figure 9:
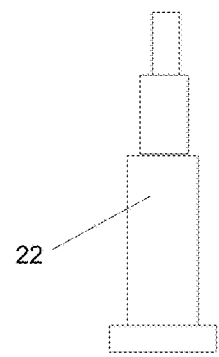
FIG. 9 is a side elevation view of a partially expanded telescoping column of a mobile stage system in accordance with principles of the invention.
Figure 10:
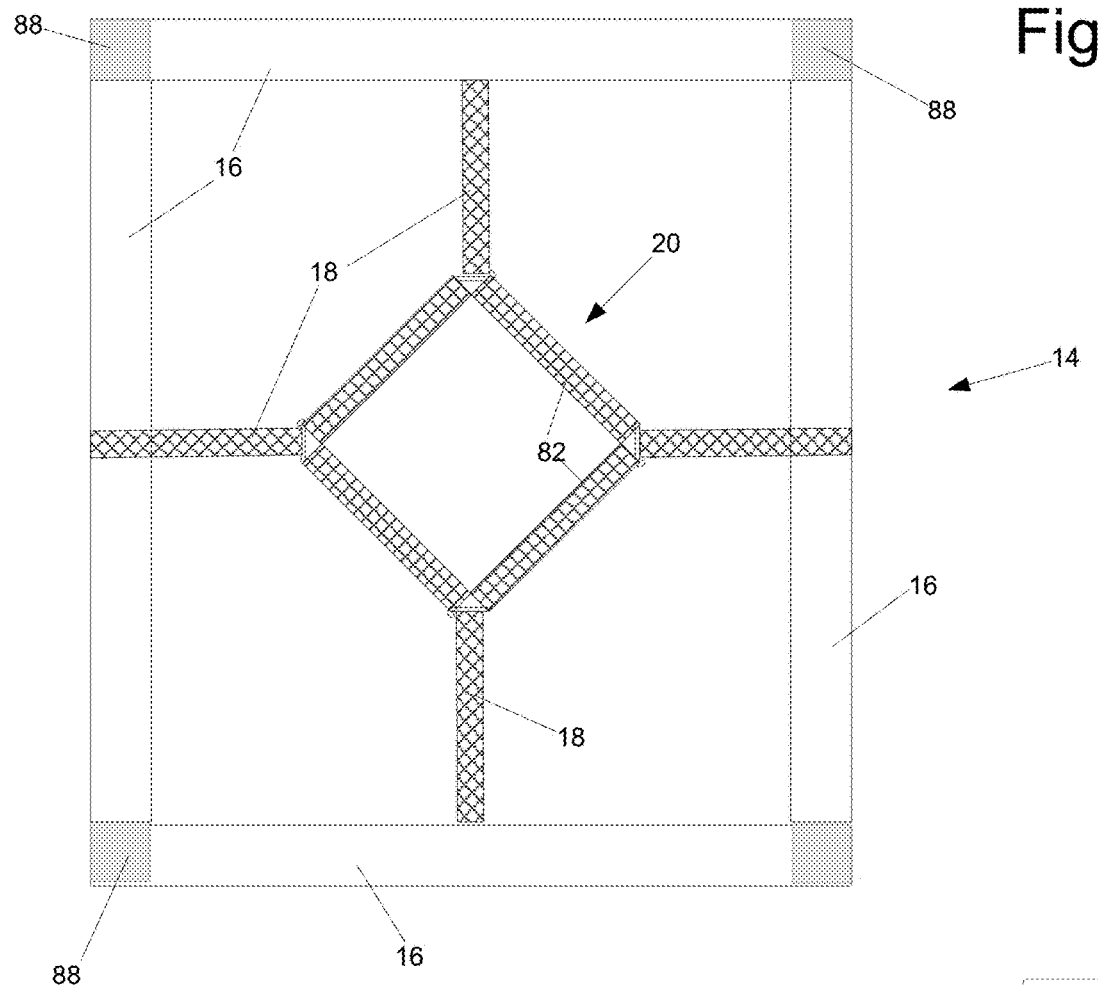
FIG. 10 is a top plan view of a fully expanded overhead framework of a mobile stage system in accordance with principles of the invention.
Figure 11:
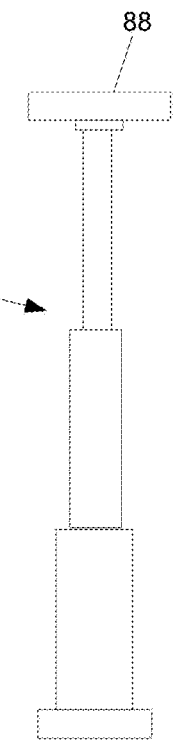
FIG. 11 is a side elevation view of a fully expanded telescoping column of a mobile stage system in accordance with principles of the invention.
Figure 12:
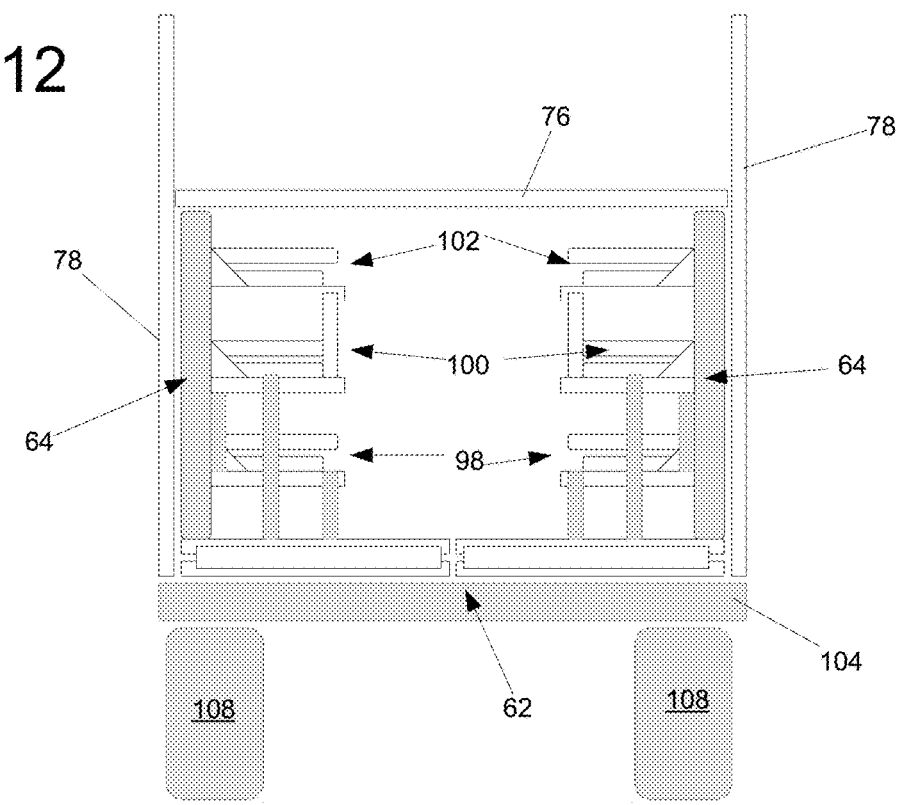
FIG. 12 is a rear elevation view of a partially disassembled mobile stage system in accordance with principles of the invention.

FIGS. 6 and 7 show the central structure 20 and radial trusses 18 of the overhead framework 14, along with the display system 25 and the telescoping columns 22 in the collapsed configuration 68 for transport. In the collapsed configuration 68, each radial truss 18 is rotated 135° about a hinge 80 such that it lies flush with each of the four central trusses 82 that form the central structure 20. The display structure 25 is rotated such that it aligns with the four central trusses 82. The telescoping columns 22 are then placed in each of the four corners of the collapsed radial trusses 18. The telescoping columns 22 may be stored in this way with or without their capital plates 88 to which they are removably attached. This configuration allows all of these components to fit within a relatively small space within the trailer 70. To assemble the mobile stage system 60 in a stage configuration 90, the radial trusses 18 are rotated out word, as shown in FIG. 8 until they are 135° relative to their adjacent central trusses 82, and are locked into place. The distal ends 92 of the radial trusses 18 are then attached to the peripheral trusses 16 as shown in FIG. 10 as well as FIGS. 1-3. If the capital plate 88 are not attached to the telescoping columns 22, they may then be affixed to the tops 94 of the telescoping columns 22 either before or after the capital plate 88 are attached to the corners of the peripheral trusses 16.

Figure 13:
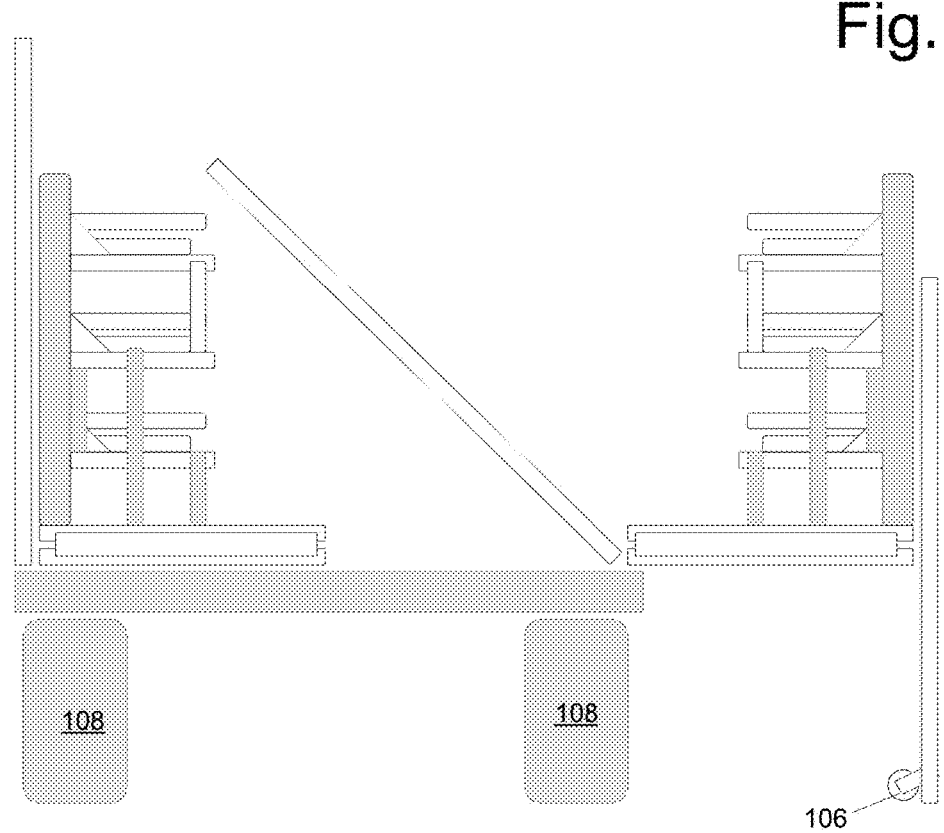
FIG. 13 is another rear elevation view of a partially expanded mobile stage system in accordance with principles of the invention.

Each of the retractable bleachers 64 have three tiers of seats 98, 100 and 102. It may be expand the retractable bleachers 64 consecutively rather than simultaneously. FIG. 13 shows one of the two retractable bleachers 64 partially expanded, with the central platform 76 partially lowered onto the top of the trailer bed 104. As the bleacher 64 is expanded, the sidewall 78 is lowered and secured in positioned such that rollers 106 is substantially level with the bottom of the wheel 108 of the trailer 70. The sidewall 78 preferably includes multiple rollers 106 that allow the sidewall 78 to support the retractable bleachers 64 in the fully expanded position as well as during the expanding of the bleachers 64.

Figure 14:
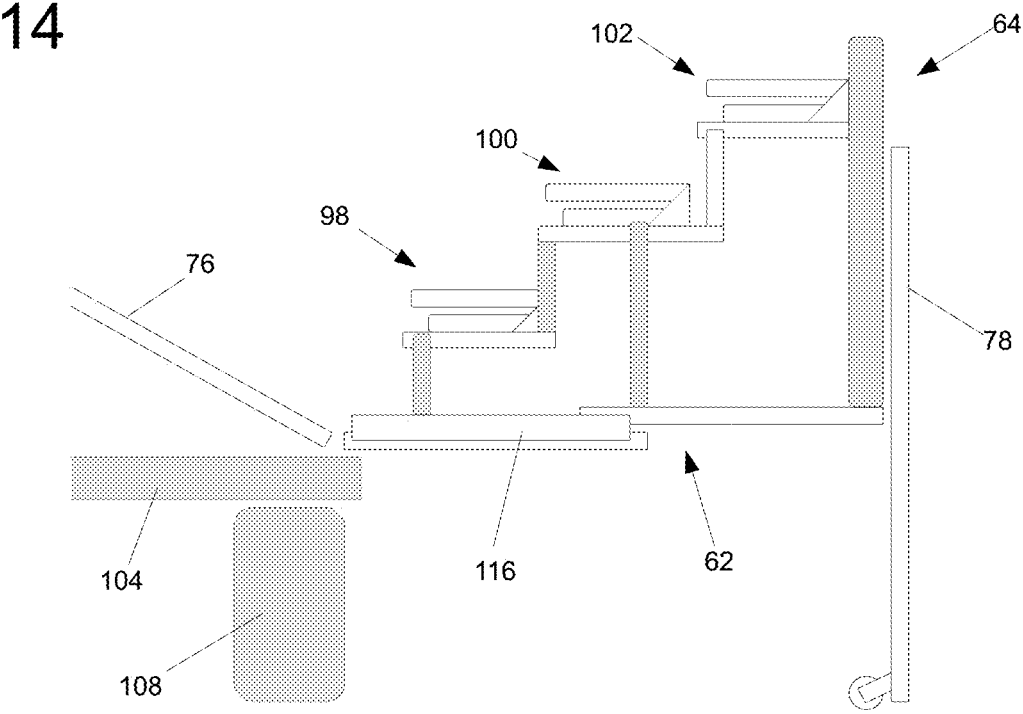
FIG. 14 is another rear elevation view of a partially expanded mobile stage system in accordance with principles of the invention.
Figure 15:
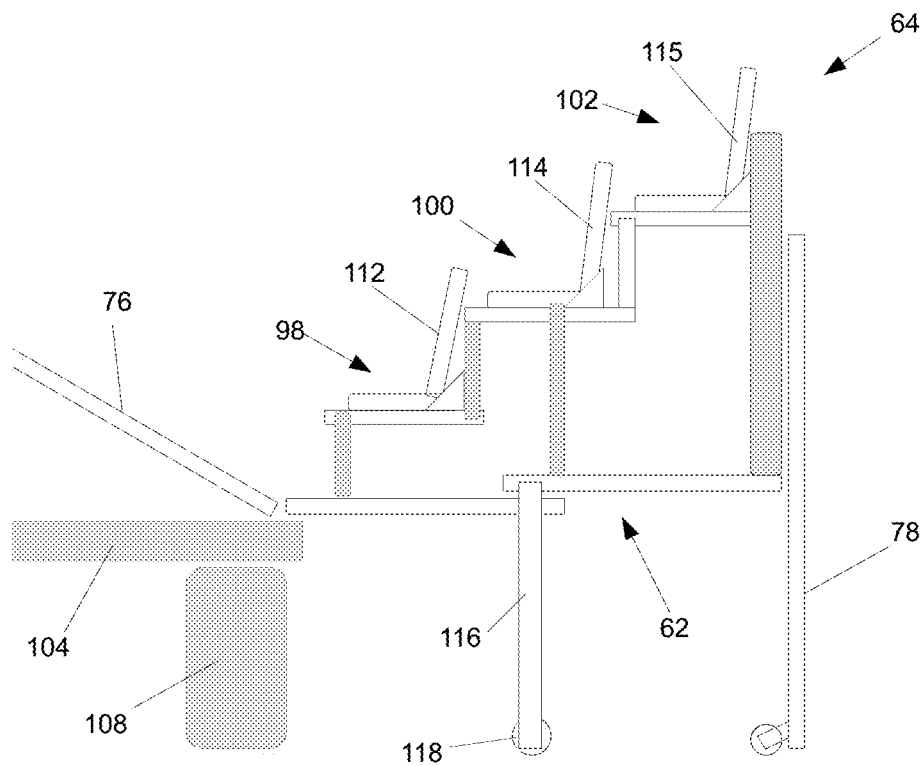
FIG. 15 is another rear elevation view of a partially expanded mobile stage system in accordance with principles of the invention.

FIG. 14 shows the bleacher 64 further expanded and FIG. 15 shows the bleacher 64 in the fully expanded position, with the backs 112, 114 and 115 of the seats 98, 100 and 102, respectively, raised. During the expansion of the bleacher 64, one or more supports 116 having rollers 118 may be rotated downward to provide additional support for the expanded bleachers 64. Those skilled in the art will appreciate that there are a wide variety of collapsible bleacher designs that would be suitable as the bleachers 64 shown herein.

Figure 16:
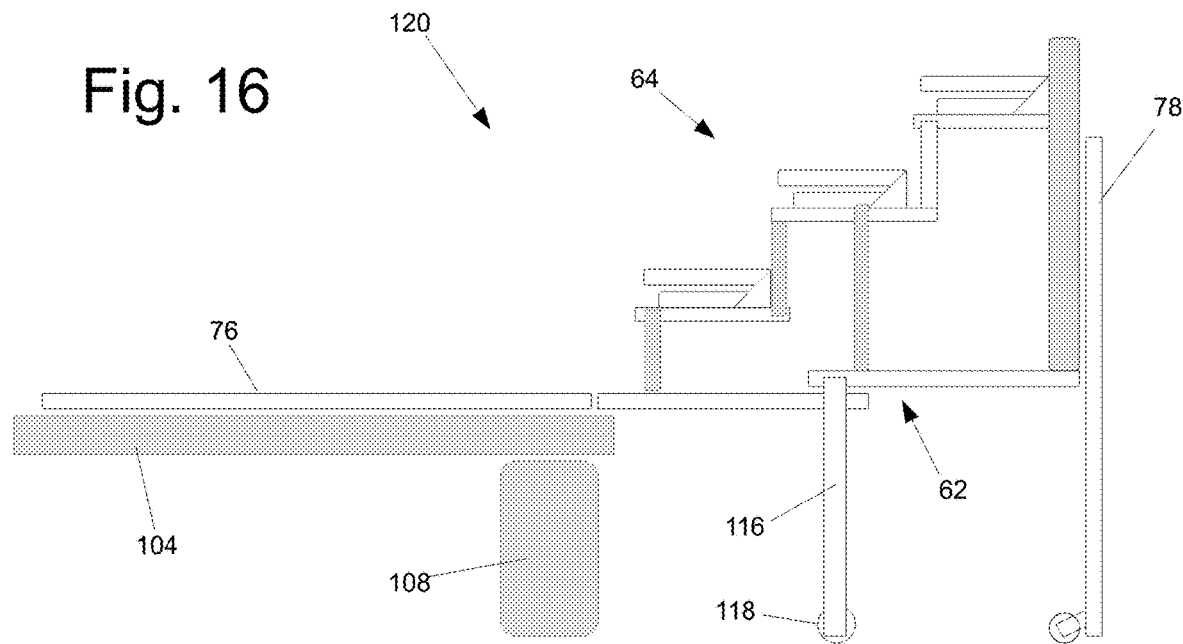
FIG. 16 is a rear elevation view of a fully expanded mobile stage system in accordance with principles of the invention.
Figure 17:
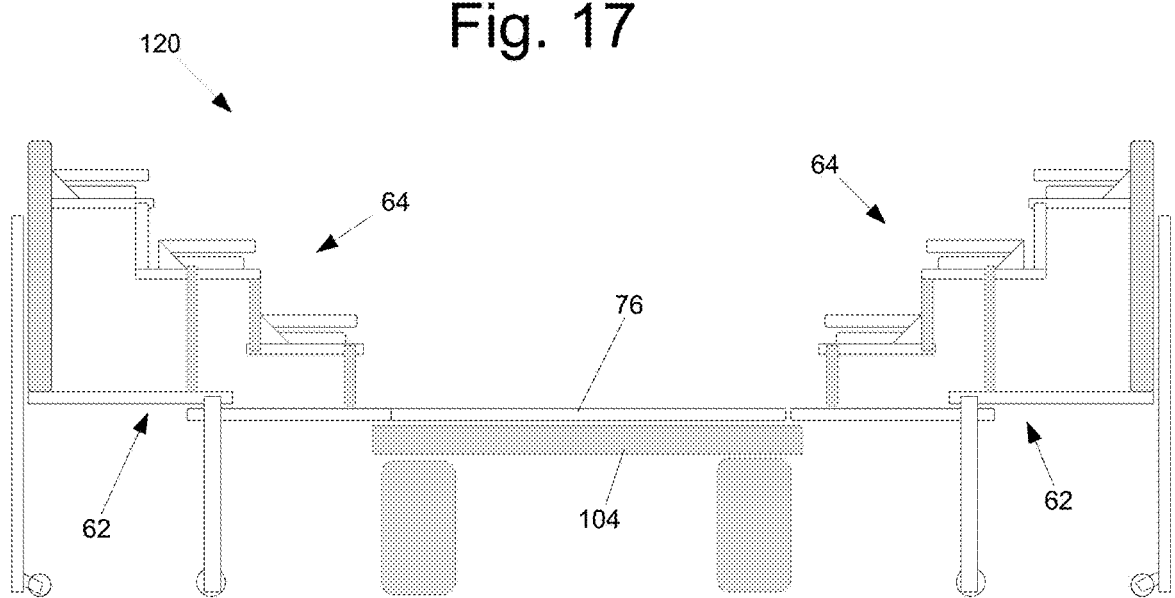
FIG. 17 is another rear elevation view of a fully expanded mobile stage system in accordance with principles of the invention.

FIGS. 16 and 17 show stage configuration 120 with the platform 76 positioned between the expanded bleachers 64. A stage may be placed on the platform 76, as well as the columns 22 supporting the overhead framework 14 and the display system 25.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. An expandable mobile stage system transportable as a single semi-truck trailer in a collapsed configuration comprising:
  a trailer bed configured to support the expandable mobile stage system when the expandable mobile stage system is in the collapsed configuration;

an overhead framework having four corners formed from four main trusses, four secondary trusses and a diamond shaped central structure and supporting a lighting system;

four collapsible telescoping columns supporting the overhead framework at each of the four corners of the overhead framework;

two opposing inward facing, retractable lateral bleacher sections facing a central stage having support structures hidden by skirts configured to retract from an expanded configuration extending outward from the trailer bed, to the collapsed configuration entirely above the trailer bed;

a central platform supporting the central stage and extending between the two opposing inward facing, retractable lateral bleacher sections when in the expanded configuration, wherein the central platform is configured to be placed above the two opposing inward facing, retractable lateral bleachers and below the four collapsible telescoping columns and the overhead framework when the expandable mobile stage system is in the collapsed configuration; and a folding staircase at a rear end of the central platform.

* * * * *